July 22, 1969  E. WITTENMAYER  3,456,969
CONNECTING ARRANGEMENT
Filed Dec. 13, 1967
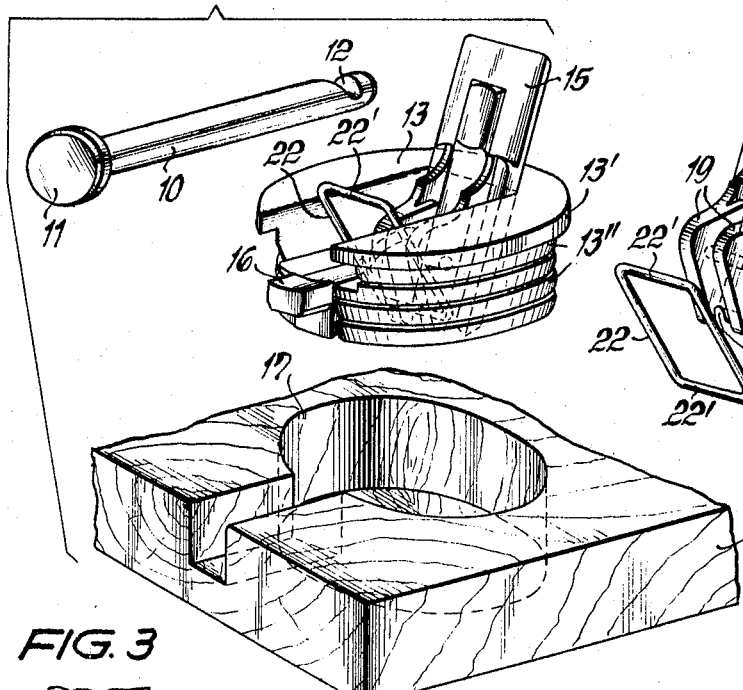
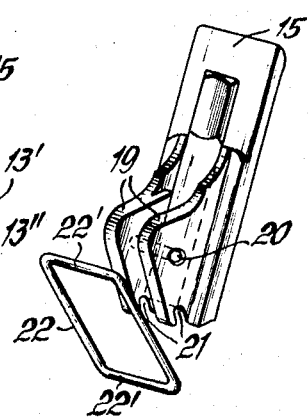
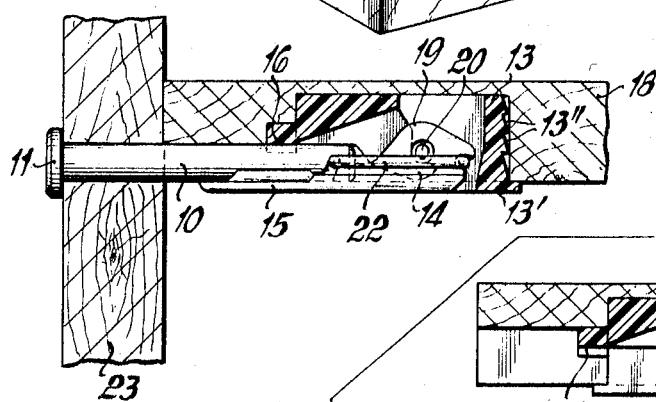
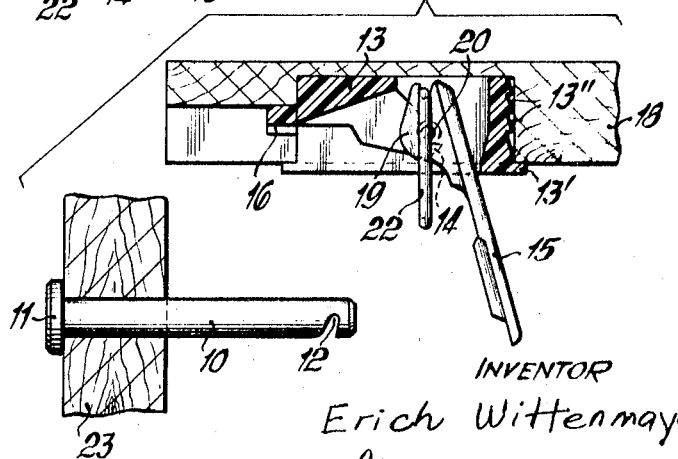
INVENTOR
Erich Wittenmayer
By Michael S. Striker
Attorney

United States Patent Office 3,456,969
Patented July 22, 1969

3,456,969
CONNECTING ARRANGEMENT
Erich Wittenmayer, Altensteig, Germany, assignor to Christian Holzapfel KG, Ebhausen, Wurttemberg, Germany
Filed Dec. 13, 1967, Ser. No. 690,223
Claims priority, application Germany, Jan. 17, 1967, H 57,704
Int. Cl. F16b 7/00, 5/00, 9/00
U.S. Cl. 287—20.926                              10 Claims

ABSTRACT OF THE DISCLOSURE

A connecting arrangement for connecting two structural members which extend at right angles to one another and abut. The arrangement comprises an elongated member anchored in one of the members and having a portion extending in parallelism with the other. A support member received in the other structural member, and an excenter member journalled in the support member and arranged to engage the portion of the elongated member for drawing the same and thereby the structural member in which it is anchored toward the other structural member.

Background of the invention

The present invention relates generally to a connecting arrangement and more particularly to a connecting arrangement for connecting structural elements which extend normal to each other and which abut one another. Still more particularly, the present invention relates to a connecting arrangement which is of particular utility in connecting two or more walls or panels of pieces of furniture or the like.

It is well known that customarily the panels constituting the side walls, top walls, bottom walls, shelves or the like of pieces of furniture are connected adhesively and/or by means of nails, screws, bolts or the like. Such connections are not always reliable and, unless bolts or screws are used exclusively, they are not releasable. It is however, becoming more and more customary to make furniture so it can be "knocked down" that is assembled and disassembled at the will of the user. This is advantageous not only in the transportation of such furniture, which will evidently require less pace and therefore less storage room at smaller cost, but also when furniture is to be moved from place to place. Of course, particularly if furniture is to be supplied in disassembled condition and the purchaser is expected to assemble the furniture himself, it is essential that such assembly require little or no skill and be quick and easy for the layman. Also, in circumstances where assembly and disassembly is expected to be accomplished repeatedly, it is essential that the connection be always reliable, even if assembly and disassembly has already been carried out several times. None of these requirements have been fulfilled with the previously known connections, of which only screw and bolt connections are of interest here because nail connections and adhesive connections are not readily releasable. If bolts or screws are utilized, the openings will eventually become unduly large as a result of repeated threading of the bolts or screws into and out of the openings. If, on the other hand, nuts or similar holding members are used, it is necessary to conceal these because their appearance is aesthetically undesirable. Therefore, such members must be embedded or otherwise hidden in the material of the panels or walls, and this is expensive and time-consuming. Furthermore bolt and screw connections have a tendency to become loosened over a period of time.

Summary of the invention

The present invention overcomes the aforementioned disadvantages.

More particularly, the present invention provides a connecting arrangement for structural elements, such as panels of pieces of furniture or the like, which permits rapid connection and disconnection of such panels without requiring any skill whatsoever. The invention is particularly applicable to room dividers or so-called "built-in walls" but is of course useful in all types of furniture which must be capable of being assembled and disassembled.

With the arrangement of the present invention loosening of the connection over a period of time is eliminated, and a tight and reliable connection is always assured, regardless of the presence or absence of skill of the person who carries out the assembly.

In accordance with one feature of my invention I provide a connecting arrangement wherein an elongated first member is anchored in one structural element and comprises a portion which extends in parallelism with another structural element, the latter extending normal to the first structural element and abutting against the same. A holding member or supporting member is embedded in the other or second structural element and an excenter member is journalled in this support member and engages the aforementioned portion of the elongated member, the excenter member being operable so as to draw the elongated member and thereby the structural element in which the same is anchored against the structural element in which the support member is anchored.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a perspective view illustrating my novel connecting arrangement in one embodiment thereof;

FIG. 2 is a perspective view of the excenter member of the embodiment in FIG. 1;

FIG. 3 is a sectional view illustrating the embodiment of FIG. 1 in assembled condition and connecting two structural elements to one another; and FIG. 4 is substantially similar to FIG. 3, but showing the connecting arrangement in separated condition with the structural elements being disassembled from one another.

DESCRIPTION OF THE PREFERRED EMBODIMENTS

Discussing now the drawing in detail, and firstly FIGS. 1 and 2 thereof, it will be seen that reference numeral 10 identifies an elongated substantially cylindrical member, which for the sake of convenience hereafter will be identified as a bolt. At one end the member 10 is provided with a head or transversely extending flange 11 and at its opposite end it is provided with a kerf 12. As FIGS. 3 and 4 illustrate the member 10 is inserted through a bore provided in a structural element 23, which may be a panel or a portion of a piece of furniture, such as one of the side walls thereof.

My novel arrangement further comprises a support member 13 which in the illustrated embodiment is of substantially cylindrical configuration and which may advantageously consist of synthetic plastic material. Of course, the choice of material encompasses a wide range but synthetic plastic material has been found advantageous because it is simple to work, can be used to produce the member 13 by injection molding and is available in a wide range of colors which makes subsequent painting of the arrangement to match the colors of the furniture unnecessary. Member 13 is provided wtih a recess and with two semi-circular cutouts 14 which are most clearly evident in FIGS. 3 and 4, and which are provided in the side walls bounding the recess in the member 13. It is advantageous that the outer peripheral face of the member 13 be provided with projecting ridges 13″ of such configuration that, when the member 13 is pushed into a correspondingly configurated recess 17 provided in another structural element 18, which is to be secured at right angles to the structural element 23, and which may for instance be a shelf or the like, the ridges 13″ will tightly retain the member 13 in the recess 17 and prevent its accidental withdrawal therefrom.

FIG. 1 shows that the member 13 is provided with a radially extending flange 13′ at one axial end thereof. In FIG. 1 I have also illustrated an excenter lever 15 which is shown in its proper position in the member 13. FIG. 2 shows this lever 15 separately and it will be evident that it is provided with two transversely spaced projecting ridges 19, in registering bores of which a pin 20 is received serving as a shaft member. When the member 15 is in place in the member 13, the pin 20 is positioned in the cutouts 14 on which it is journalled. Rearwardly of the axis of rotation defined by the pin 20, the ridges 19 are each provided with a cutout 21 in which a frame-shaped wire member 22 can be engaged. This is most clearly evident in FIGS. 3 and 4 where it will be seen that one of the transverse portions 22′ of the members 22 is received in the cutouts 21 of the members 15 whereas the other transverse portion 22′ is received in the curve 12 of the member 10.

FIG. 3 shows the use of my novel connecting arrangement for connecting two structural elements 18 and 23 at right angles to one another and in abutment with one another. The bolt or member 10 is received in a bore of the element 23, as already discussed. The member 13 is received in the recess 17 of the element 18 so that a projecting lip 16 of the member 13 which defines a support on which the front portion of the member 10 rests, is located in a corresponding section of the recess 17 in the element 18. The member 22 is connected to the curve 12 and the cutouts 21 in the manner just described and it is evident that as the lever 15 is turned about the axis defined by the pin 20 the member 22 draws the member 10 in the direction towards this axis and thereby draws the structural element 23 under tension against the structural element 18.

FIG. 4 shows the structural elements 18 and 23 in the released condition. To effect such release it is simply necessary to turn the lever 15 from the position illustrated in FIG. 3 to that illustrated in FIG. 4 about the axis defined by the pin 20 and to disengage the member 22 from the curve 12 of the member 10. Now the elements 18 and 23 can be separated. Subsequently, the connection can be reestablished in precisely the same manner as before and it will be evident that this connecting or disconnecting requires no skill at all. Of course, the provision of the ridges 13″ assure that the member 13 is reliably retained in the recess 17 without any need for adhesives, thus contributing towards quicker assembly, saving of material and lowering of costs.

The use of synthetic plastic material has already been discussed, and some of the reasons set forth why such material is advantageous. It remains to be pointed out that such material also has a certain elasticity and is thus able to compensate to some extent if excessive stresses should develop.

It will be understood that each of the elements described above, or two or more together, may also find a useful application in other types of connecting arrangements differing from the types described above.

While the invention has been illustrated and described as embodied in a connecting arrangement for connecting structural elements to one another, it is not intended to be limited to the details shown since various modifications and structural changes may be made without departing in any way from the spirit of the present invention.

What is claimed as new and desired to be protected by Letters Patent is set forth in the appended claims.

I claim:

1. A connecting arrangement, particularly for connecting panel members in abutting relationship and at right angles to one another, comprising an elongated first member anchored in one panel with a portion of the member extending in parallelism with another panel positioned at right angles to the one panel; a second member received in a recess provided in the other panel and defining a pivot axis extending transversely of the elongation of said first member; and an excenter arrangement journalled in said second member for turning movement about said pivot axis and including an engaging portion, said excenter arrangement further including a connecting member separably connected with said engaging portion and adapted for interlocking engagement with said first member so as to be operable for drawing the latter toward said pivot axis in response to turning of said excenter arrangement about the same, to draw the panels into abutting engagement.

2. A connecting arrangement, particularly for connecting panel members in abutting relationship and at right angles to one another, comprising an elongated first member adapted to be enclosed in one panel with a portion of the member extending in parallelism with another panel positioned at right angles to the one panel; a second member adapted to be received in a recess provided in the other panel and defining a pivot axis extending transversely of the elongation of said first member; and an excenter arrangement, including a lever journalled in said second member for turning movement about said pivot axis and provided with at least one hook portion, and a connecting member adapted to engage said hook portion and said portion of said first member for drawing the panels into abutting engagement in response to turning of said lever about said pivot axis.

3. An arrangement as defined in claim 2, wherein said first member is substantially cylindrical and said portion thereof is provided with a kerf, said connecting member being an annulus engageable in said kerf and said hook portion of said lever.

4. An arrangement as defined in claim 2, said lever comprising a larger arm and a shorter arm respectively located on opposite sides of said axis, and said hook portion being provided on said shorter arm.

5. An arrangement as defined in claim 2, wherein said secnd member and said lever consist of injection-molded material.

6. An arrangement as defined in claim 5, wherein said material is synthetic plastic material.

7. An arrangement as defined in claim 1, said second member being of circular cross-section and having an outer circumferential surface; and further comprising retaining means provided on said surface and operative for retaining said second member in a recess provided in said other element.

8. An arrangement as defined in claim 7, wherein said retaining means comprises circumferential ridges provided on said surface and adapted to engage the material of said other element which bounds the recess provided therein.

9. An arrangement as defined in claim 7, said second member further having an exposed face extending transversely of said surface and provided with a recess within which said pivot axis is located; said excenter arrangement including a lever journalled in said recess for turning movement about said pivot axis to and from a position in which said panels are drawn into abutment, and said lever overlying and covering said recess when in said position.

10. An arrangement as defined in claim 2, said first member being pin-shaped and said second member being of substantially circular configuration and having a circumferential surface and an exposed face provided with a recess within which said pivot axis is located, said second member further comprising a support lip extending from said recess outwardly beyond said surface and configurated and positioned so that said pin-shaped first member is supported thereon when said first and second members are connected with one another.

References Cited

UNITED STATES PATENTS

| | | | |
|---|---|---|---|
| 347,101 | 8/1886 | Ferry | 292—247 |
| 2,710,214 | 6/1955 | Summers | 292—247 |
| 3,279,830 | 10/1966 | Strom | 287—20.92 |

FOREIGN PATENTS

| | | |
|---|---|---|
| 654,095 | 6/1951 | Great Britain. |
| 354,223 | 1961 | Switzerland. |

CARL W. TOMLIN, Primary Examiner

ANDREW V. KUNDRAT, Assistant Examiner

U.S. Cl. X.R.

287—54